United States Patent [19]

Rojey

[11] Patent Number: 5,896,896
[45] Date of Patent: Apr. 27, 1999

[54] METHOD OF TRANSPORTING A FLUID IN A PIPELINE HAVING A POROUS STRUCTURE

[75] Inventor: Alexandre Rojey, Rueil Malmaison, France

[73] Assignee: Institut Francais du Petrole, Rueil-Malmaison, France

[21] Appl. No.: 08/968,124

[22] Filed: Nov. 12, 1997

[30] Foreign Application Priority Data

Nov. 13, 1996 [FR] France ................................ 96 13924

[51] Int. Cl.$^6$ ................................................ F16L 9/14
[52] U.S. Cl. ...................... 138/177; 138/178; 138/DIG. 9
[58] Field of Search ................................ 138/177, 178, 138/104, 149, 175, DIG. 9

[56] References Cited

U.S. PATENT DOCUMENTS

| | | | |
|---|---|---|---|
| 3,210,229 | 10/1965 | Feine | 138/178 |
| 3,718,172 | 2/1973 | Rice et al. | 138/143 |
| 3,847,722 | 11/1974 | Kistner | 138/97 |
| 4,093,760 | 6/1978 | O'Malley | 138/178 |
| 4,115,616 | 9/1978 | Heitz et al. | 138/177 |
| 4,393,901 | 7/1983 | Beck | 138/177 |
| 4,448,538 | 5/1984 | Mantel | |
| 4,453,570 | 6/1984 | Hutchison | 138/149 |
| 4,775,585 | 10/1988 | Hagiwara et al. | 138/178 |
| 4,958,653 | 9/1990 | Lowther | |
| 4,966,201 | 10/1990 | Svec et al. | 138/149 |
| 5,020,561 | 6/1991 | Li | |
| 5,267,612 | 12/1993 | Cassin | |
| 5,746,253 | 5/1998 | Dust et al. | 138/140 |

FOREIGN PATENT DOCUMENTS

| | | |
|---|---|---|
| 196350 | 10/1986 | European Pat. Off. |
| 2076115 | 10/1971 | France |
| 2116387 | 7/1972 | France |

*Primary Examiner*—Patrick Brinson
*Assistant Examiner*—James F. Hook
*Attorney, Agent, or Firm*—Antonelli, Terry, Stout & Kraus, LLP

[57] ABSTRACT

A method of conveying a fluid (I) in a pipeline, the pipe having a porous structure or a porous lining into which a fluid (II) which is at least partially immiscible with the conveyed fluid is injected. A pipeline for conveying a fluid (I) having a porous structure or a porous lining allowing a fluid (II), which is at least partially immiscible with the fluid (II), to be retained in the pores.

17 Claims, 2 Drawing Sheets

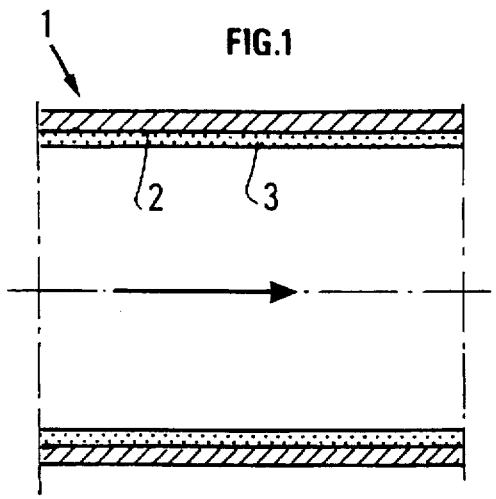
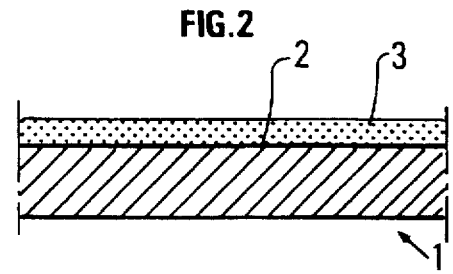
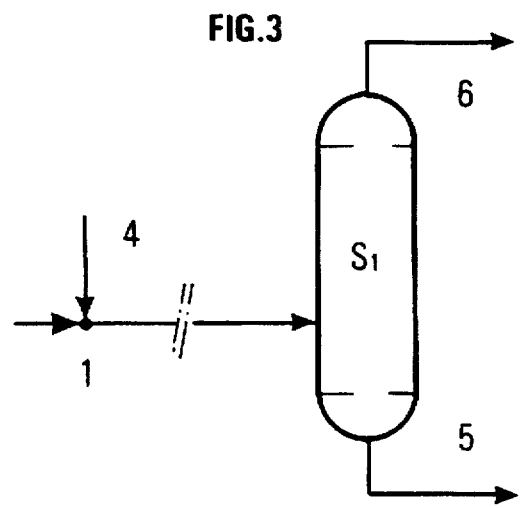
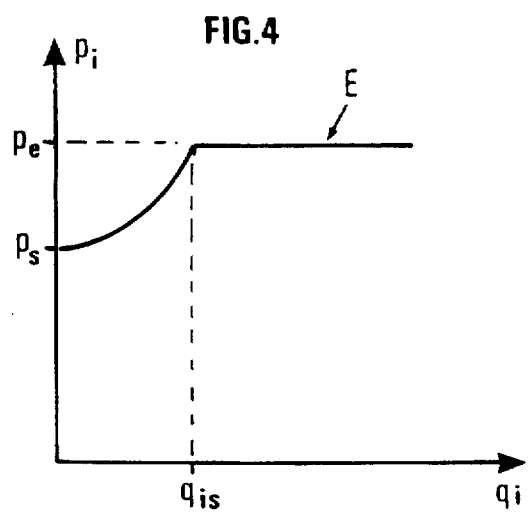
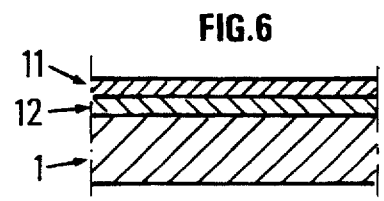
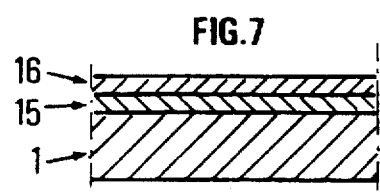
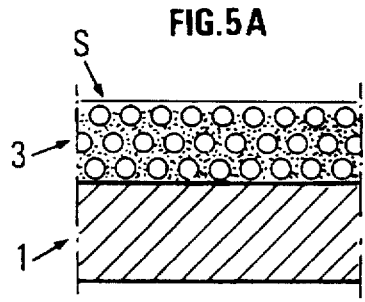
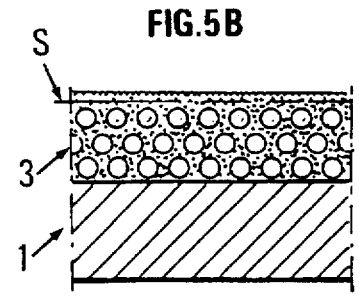
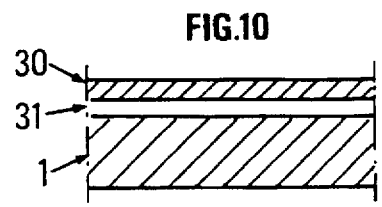

METHOD OF TRANSPORTING A FLUID IN A PIPELINE HAVING A POROUS STRUCTURE

The present invention relates to a method of reducing the friction which occurs between a fluid in a state of flow and the wall of a pipe in which it is being conveyed.

It can be applied in particular to the transportation of a viscous liquid and for conveying compressed gas and has the advantage of reducing pressure losses due to friction in particular.

It may be used for conveying a viscous petroleum crude in a pipeline, a heavy petroleum or a crude paraffinic petroleum, for example.

It also finds applications in instances where natural gas is transported under pressure, an field which involves significant amounts of finance and in which the inter-continental gas pipelines used to convey gas require considerable capital investment. Gas is generally transported over large distances and at a pressure in the order of 70 bar onshore although this can reach something in the region of 160 bar in the case of an offshore pipeline. In the majority of cases, the natural gas transported is at least 90% methane.

Pressure falls considerably due to friction between the gas flowing in a turbulent state and the internal wall of the gas pipeline, particularly because of the long distances over which the gas is conveyed, and this tends to increase production costs substantially. It is therefore necessary to reduce these losses in pressure.

One approach to compensating losses in pressure due to friction is to install re-compression stations at regular intervals along the route of the pipeline, programmed to offset any pressure losses. However, an arrangement of this type represents significant additional capital investment and in addition requires higher power consumption and increased operating costs.

Furthermore, in the case of offshore pipelines, the re-compression method used during the course of transport presents numerous practical difficulties.

The prior art describes the use of additives such as polymers, which are incorporated with the fluid to be conveyed in specifically determined proportions intended to reduce the occurrence of friction.

The method described in patent U.S. Pat. No. 4,958,653 allows the anti-friction additives added to be metered in a transport pipeline so as to increase the flow rate of the gas under set pressure loss conditions.

The main teaching of this document resides in a method which is essentially implemented by the following steps: a compressed gas is introduced into a pipeline, a quantity of additives is injected into the pipeline at a first location, the flow rate of the gas is monitored at a second location along the pipeline and the quantity of additives injected at the initial location is adjusted until the flow rate measured at the second location reaches a maximum value.

The additive will also fill in rough areas in the internal wall of the pipeline so that any roughness in the pipe will be minimised, thereby reducing the occurrence of friction.

However, a method such as this will not allow pressure losses to be minimised for a fixed gas flow rate.

For the purpose of conveying a viscous liquid, such as a petroleum crude, a method is described whereby a less viscous liquid such as water is added, which, as it flows with the more viscous liquid, allows friction against the wall to be reduced.

When conveying a compressed gas, the loss in pressure can be reduced by injecting a liquid which is more viscous than the gas being transported, in keeping with conditions that will allow an annular flow to be established as described in application Ser. No. 96/08.914.

The present invention proposes a method and a pipeline having a porous structure over at least a part of its length and/or thickness which is capable of at least retaining a fluid injected into it.

The principle underlying the method of the invention consists in using a pipeline constructed so that it has a certain porosity over at least a part of its length and its thickness or which has a porous lining on a level with its internal wall, capable of retaining a fluid (II) in its pores which is at least partially immiscible with the fluid being transported (I). The fluid (II) retained in the pores serves as a lubricant and allows losses in pressure to be reduced whilst the fluid (I) flowing through the pipeline is being transported.

The present invention relates to a method of transporting a fluid (I) in a pipeline. It is characterised in that the fluid (I) is injected into a pipeline which has, over at least a part thereof, for example over its length and/or its thickness, a porous structure having pores and exhibiting a porosity of a certain value and at least one second fluid (II) is injected into the interior of this porous structure, where it is retained, the fluid which is injected being at least partially immiscible with the fluid (I) being transported.

The porous structure is a porous lining, for example. The second fluid (II) at least is injected into this lining arranged over at least a part of the internal wall of the transport pipeline.

The second fluid (II) is injected into the porous structure at a point essentially located in the vicinity of the pipe inlet and at a sufficient flow rate to ensure that the injection pressure will stabilise at a value essentially close to the pressure of the fluid (I) prevailing at the pipe inlet.

The fluid (II) is injected simultaneously with one or more other products, such as anti-corrosion products and/or anti-hydrates, for example.

By dint of one implementing method, the second fluid (II) is heated before it is injected into the porous structure At least one heat insulation lining is arranged between the internal wall of the pipe and the porous lining, for example.

In another method of implementation, at least two porous structures are used and two fluids of different natures are circulated inside each of these porous structures, the two fluids being at least partially immiscible.

The two porous structures may be formed by the wall of the pipe itself, for example, and may have two zones of differing porosities or two porous linings may be laid one on top of the other, one of the two being disposed on the internal surface of the wall.

By virtue of another embodiment, it would be conceivable to set up an arrangement consisting of a pipe having a porous structure to form the first porous structure and then laying a porous lining on top of this first porous structure.

The present invention also relates to a pipeline for transporting at least one fluid (I). It is characterised in that it has a porous structure over at least a part of its length and its thickness, said porous structure exhibiting a certain degree or porosity or a certain porosity value which allows at least a second fluid (II) which is at least partially immiscible with said fluid being transported (I) to be retained inside said pores.

The porous structure may form part of the wall of the pipe and/or it may be formed by one or more porous linings disposed on the internal wall and inside which fluids of differing natures are circulated, said fluids being at least partially immiscible.

In accordance with one embodiment, the pores of the porous structure are arranged close to the inner surface of the porous structure of the pipe or the internal surface of the porous lining and are of a diameter of less than 10 microns, for example.

By internal surface is meant the surface of the wall in contact with the gas, for example.

The porous structure will be wettable by the fluid (II), for example.

In accordance with one embodiment, at least one of the porous linings is an internal lining providing heat insulation.

The pipe may also have a porous structure which is formed by a porous tube, for example, inserted in said pipe so as to produce an annular space delineated by the internal surface of the wall and the external surface of said porous tube.

Advantageously, the method and the device of the invention can be specifically applied in the following situations:
- the fluid (I) to be transported is a compressed gas and the fluid (II) penetrating the porous structure is a liquid,
- the fluid (I) is a compressed natural gas, for example, and a fluid (II) consisting of a liquid hydrocarbon phase, for example, is used to fill the porous structure,
- the fluid (I) to be transported is a petroleum crude and the fluid used to fill the pores is an aqueous phase,
- the fluid (I) to be transported is a liquid and a gas is used to fill the pores.

Other features and advantages of the present invention will become clear from the description given below by way of example in the context of applications relating to the transport of a natural gas in a pipeline, although these are not restrictive, and with reference to the appended drawings, in which:

FIGS. 1 and 2 illustrate respectively an example of a porous structure for a pipe in accordance with the invention and a detail of this structure, FIG. 3 illustrates the system used to implement the invention, FIG. 4 gives the injection pressure curve of the fluid injected into the porous structure in the pipe, FIGS. 5A and 5B show the way in which the injected fluid is distributed in the porous structure, FIG. 6 gives an example of a porous structure for a transportation pipeline, FIGS. 7 and 8 shows respectively an example of a pipe structure having two internal porous linings and a system for implementing the method of the invention, FIG. 9 gives the injection pressure curve in the instance where two porous linings are used, FIG. 10 illustrates a transportation pipeline in which a porous tube has been inserted, and FIG. 11 shows an example of how the method of the invention can be applied to a production well.

The principle of the method of the invention is described in relation to FIG. 1 and applied to the conveyance of a compressed gas representing fluid (I), for example.

The pressurised gas is flowing through a transport pipe or a pipe element having a porous structure and a certain degree of porosity or a certain porosity value. By the terms "porous structure" is meant a pipeline having pores over at least a portion of its length and/or its thickness and a degree of porosity such as described below or alternatively one or more porous linings arranged on the internal wall of the pipeline. Where a porous pipe is used, one or more zones can be sectioned off so as to have differing porosity values. The pipe element 1 has a porous lining 3 on its internal 1, for example, the pores of which are at least partially interconnected so that they communicate with each other.

This porous lining is made from a sintered metal, for example, or alternatively from a non-metallic material such as a polymer, or possibly a mineral material such as a silica, an alumina or a silica-aluminate. The porous lining may therefore have a foam texture so as to provide the interconnecting pores.

The internal diameter of the pipe ranges from several inches to several tens of inches, for example. It may be greater than this, for example between 56 and 70 inches.

If the porous structure in the pipe is a porous lining, for example, the thickness of this lining ranges by preference between 1 and 10 mm.

The method is implemented by injecting into the interior of the porous structure a second fluid (II), such as a non-volatile liquid for example, so that it penetrates the lining, which it will be able to do because of the interconnections between the pores, for example, such that all or most of the liquid is circulated or diffused through the porous structure.

The injected liquid may be at least partially an organic phase of a sufficiently low volatility to prevent too great a loss by evaporation in the gas being transported.

This organic phase contains a hydrocarbon phase, for example, such as a heavy fraction of petroleum crude, which might be used as a lubricant base.

This hydrocarbon phase may also be a condensate fraction if the fluid being transported is a condensate gas.

The liquid contained in the pores may also be an aqueous phase and by preference a phase containing an organic solvent so as to prevent the risk of any hydrates formation. This organic solvent is an alcohol, for example, such as methanol, or a glycol such as monoethylene glycol or diethylene glycol. A solution of this type is of advantage if transporting an initially water-saturated gas.

The porous structure or the porous lining is selected so that it will be wettable by the fluid injected into the pores.

FIG. 3 illustrates an example of the system used to implement the method of the invention.

The gas is flowing through the transport pipe 1 which has a porous structure over at least a portion of its length such as described in relation to FIGS. 1 and 2. The fluid, for example a liquid, is injected via a pipe 4 connected into the transport pipeline 1 on a level with the inlet thereof and such that the injected liquid penetrates the porous structure.

Advantageously, the value of the pore diameter is selected so that the pores will be capable of retaining a fluid and is preferably less than 10 microns.

The transport pipe 1 feeds into a separator $S_1$ in which the liquid penetrating the pores is separated from the gas being transported and is discharged via the pipe 5 located in the lower part of the separator, for example, from where it can be recycled back to the inlet of the transport pipe and/or to any other point. The separated gas is discharged from the separator $S_1$ via a pipe 6 located at the upper part thereof, for example.

The liquid is retained in the pores of the porous structure in the pipe or the porous lining by capillary effect. Whilst the flow rate of the liquid remains very low, or even zero, the pressure within the liquid will remain close to the gas pressure at the outlet of the transport pipe 1. In order for the liquid to be able to remain in the porous medium, the capillary pressure must be in excess of the differential value ($\Delta P$) between the pressure $p_e$ of the gas at the inlet of the transport pipe and the pressure $p_s$ at the outlet of the pipe.

If, for example, the pressure difference ΔP is approximately 1 bar, such as in the case of water at 20° C., the pore diameter must be less than approximately 3 microns to ensure that the liquid will be retained in the porous medium rather than move in circulation.

More generally speaking, the diameter of the pores in the porous medium or the porous structure in the pipe will be close to the internal surface of the lining, i.e. the surface which is in contact with the gas being transported, and will preferably be less than 10 microns.

FIG. 4 gives the curve showing changes (E) in the injection pressure of the liquid $p_i$ as a function of the injection rate $q_i$.

If, initially, the conditions are such that the capillary pressure will not be sufficient to prevent the gas flowing through the pipeline from penetrating the interior of the porous lining, injection of the liquid commences at an increasing rate $q_i$ and the injection pressure $p_i$ of the liquid at the inlet of the transport pipe 1 will assume a course such as that illustrated by the curve (E).

It may be noted that on this curve, from the point at which the injection pressure equals $p_s$, the pressure value $p_i$ increases with the flow rate $q_i$ until it reaches the pressure value $p_e$ of the gas at the pipe inlet for a liquid flow rate value expressed as $q_{i,s}$ or threshold value as shown in FIG. 4.

For a flow rate value $q_i$ higher than the value $q_{-i,s}$, the pressure $p_{i,i}$ (pressure of the injected liquid) stabilises at the level $p_e$ of the gas pressure at the inlet of the transport pipe 1. This corresponds to conditions in which the liquid is not totally contained in the porous lining and forms a film which flows on the internal surface of the porous lining or porous structure in the pipe. The liquid film thus formed is close to the gas being transported.

FIGS. 5A and 5B illustrate two examples of the way in which the liquid is distributed inside the pores.

FIG. 5A shows the situation in which the flow rate value $q_i$ of at least some of the injected liquid is less than the flow rate value $q_{i,s}$, in which case the liquid is contained in the pores.

FIG. 5B illustrates the situation where the flow rate value $q_i$ is greater than the threshold value $q_{i,s}$, corresponding to a situation where the liquid is distributed through the porous structure and a thin film of liquid forms on the internal surface (S) of the porous lining. This thin film is flowing through the pipe.

Figure 8:
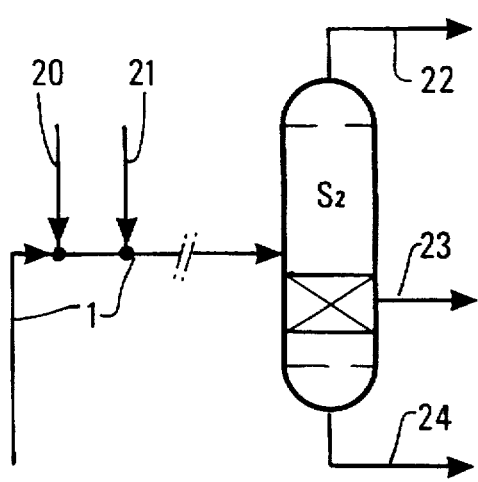
Figure 9:
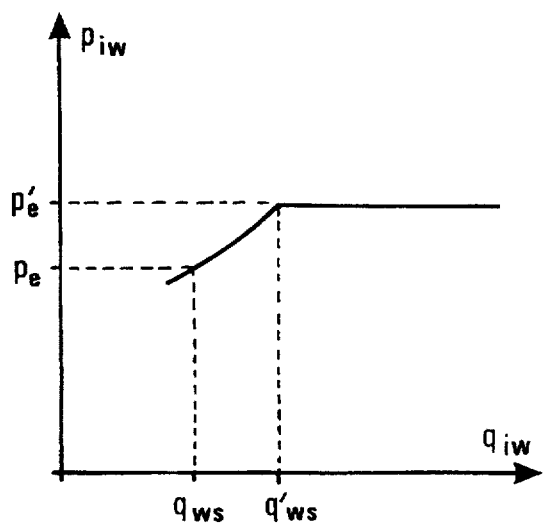

The distribution of liquid as described in FIG. 5B is of particular advantage when trying to reduce the losses in pressure which occur when transporting compressed gas, for example. The reduction in pressure loss which can be achieved by this method may be as much as 20 to 50% of the total pressure loss as compared with a pipe which does not have a porous lining or is not designed to have an appropriate porous structure, for example.

In order to limit the liquid flow rate $q_{i,j}$ it is an advantage to operate at a flow rate $q_i$ slightly in excess of the threshold flow rate $q_{i,s,t}$, by injecting the liquid at a flow rate $q_i$ at least 20% higher than $q_{i,s}$.

The pressure change curve (E) of FIG. 4 is determined by raising the flow rate value $q_i$, for example, using a flow meter and varying the injection pressure $p_{i,s}$ measured using a pressure sensor. This curve can be used to determine the threshold value $q_{i,s}$.

In accordance with one embodiment of the invention, the liquid fraction penetrating the pores is injected with one or more anti-corrosion and/or anti-hydrate additives, commonly used in the petroleum industry. This helps to prevent the transport pipes from deteriorating and/or the formation of deposits which might block the pipeline in the long term and prevent the transportation of fluid.

An additional liquid may also be injected to promote the stability of the film, for example stabilising polymers or anti-gelling additives of the glycol type.

When using the invention in this type of implementation, if the fluid being transported is susceptible to deposit formation, the method of the invention facilitates the removal of such deposits.

To this end, the fluid is injected into the porous structure at a flow rate $q_i$ which is at least greater than the threshold value $q_{i,s}$. With this approach, at least some of the injected fluid is evacuated from the porous lining to the interior of the pipe and is so along the entire length of the pipe having the porous properties described above, the effect of which is to chase away any deposits which might be forming on the surface of the internal pipe wall.

If deposits do gradually form and build up on the inside wall of the pipeline, another approach is to bring about a sharp increase in the injection rate of the liquid. This sharp increase has the effect of detaching any deposits which may have formed on the wall. The flow rate can then be decreased so as to return to normal operating conditions and the normal operating flow rate can be applied again once the wall surface has been cleaned.

In accordance with another embodiment intended to prevent the formation of hydrates, a hot fluid can be injected into the pores, the effect of which is to increase the temperature of the internal lining or porous structure, for example.

FIG. 6 illustrates a structure which can be used to inject a hot fluid. A layer of heat insulation material 12 is arranged between the metal wall 10 of the transport pipe and the porous lining 11, one of the functions of which is to prevent the pipe from heating and dissipating the heat towards the exterior.

The layer of insulating material 12 is made from a polymer material, for example, and the heating liquid will circulate inside the porous lining.

This method of heating is operated on its own or in combination with other heating methods, such as electrical methods using the Joule effect and/or induction.

The method of the invention described above can be applied in particular to the transportation of compressed natural gas as well as to the transportation of all types of compressed gas in a pipeline.

In accordance with another approach to implementing the method of the invention, the method is used to transport a viscous liquid or alternatively a liquid which is likely to adhere to the wall of the pipe, such as a petroleum crude, in particular a relatively heavy petroleum crude or a paraffinic petroleum crude, in which case this liquid will be liquid (I) and another fluid (II), which is at least only partially immiscible with the liquid being transported, will be injected into and contained within the porous lining.

If a petroleum crude were being transported, this fluid (II) might be an aqueous phase, for example.

This being the case, the operating provisions and conditions would be similar to those used to transport gas as described in relation to FIGS. 1 to 6.

The transport pipeline will have a porous lining, for example, such as that described above, and the pores would be at least partially connected to one another as with the embodiments described above.

The porous lining is selected by preference so that it is wettable by the injected liquid, for example the aqueous phase injected at a controlled flow rate via the pipe 4 and discharged via the pipe 5 once it has been separated from the petroleum crude in the separator $S_1$, the petroleum crude being discharged via the pipe 6.

The injection flow rate will follow a course essentially identical to the curve (E) described in relation to FIG. 4.

The injection conditions, for example the flow rate value $q_i$, whether the liquid is injected singly or with other products such as the additives mentioned above, will be essentially identical to the conditions described above. The transport pipe will have a porous structure such as that described above.

In accordance with another method of implementing the invention, a liquid phase, which will be fluid (I), is conveyed in the pipe and a gaseous fluid or fluid (II) will be injected into the porous structure.

The fluid (II) used to transport a petroleum crude is a natural gas, for example, or a fraction of a natural gas, such as the natural gas produced simultaneously with the petroleum crude.

It is also possible to use a different type of gas such as nitrogen or carbon dioxide.

In this case, a pipe will be used which has a porous lining preferably not wettable by the liquid being transported, i.e. it might be an oleophobic substance, for example, if transporting a petroleum crude.

The operating mode will be one of those described in conjunction with FIGS. 1 to 3 under operating conditions whereby the flow rate value $q_i$ is preferably set higher than the flow rate value $q_{i,s}$, as mentioned above.

In essentially the same manner, the separator allows the liquid being transported to be separated from the gaseous phase injected into the pores.

In another method of implementing the invention, the method of using two at least partially immiscible fluids is applied.

It is of advantage to use this method when transporting two fluids, where one of the fluids has a relatively low flow rate compared with the other fluid being transported. This being the case, the method enables the fluid with the lowest flow rate by volume to be transported through the porous lining or porous structure.

The passage section of the porous lining must then be essentially proportional to the flow rate by volume of the fluid circulating through this porous lining. For a given diameter, the thickness of this lining is therefore essentially proportional to the flow rate of the fluid which is circulating therein.

This arrangement is of particular advantage if the pipeline changes directions, has low points and high points or even vertical sections. Advantageously, the method will prevent liquid from accumulating in the low points and will prevent gas from building up in the high points of the pipe. This will also prevent the formation of plugs, especially large plugs which have a tendency to build up in upward flow, which are difficult to control and require the use of substantial capacities on arrival at the processing and despatching installations to prevent disruption of the plants.

The method of the invention can be applied to tri-phase transport, for example the conveyance of a gas containing a liquid hydrocarbon fraction and a liquid aqueous phase.

In this type of case, a pipe or a pipe element with a structure such as that described in FIG. 7 is used, for example.

The wall of the transport pipeline is metal and has two internal linings one on top of the other, a first internal porous lining 15 which is preferably wettable by water and a second porous lining 16 which is preferably wettable by the liquid hydrocarbon fraction.

The liquid aqueous phase is injected through the fist porous lining 15, for example, so that the water circulates through the pores of this lining and the liquid hydrocarbon fraction is injected into the pores of the second porous lining.

FIG. 8 illustrates a system allowing operation of this type.

The transport pipe line 1 is connected to at least two pipes 20 and 21 linked respectively to the two internal porous linings 15 and 16 (FIG. 7).

As the gas flows through the transport pipe 1, the water is injected through the pipe 15 so that it penetrates the pores of the first lining 15 and the liquid hydrocarbon fraction is injected via the pipe 21 so that it fills the pores of the second lining 16. The two injected fluids circulate inside the internal linings whilst the gas is conveyed through the pipe 1, for example, as far as the separator $S_2$ located at the end of the pipe.

On a level with the separator, the three fluids or phases are separated, the lightest gaseous phase being discharged via a pipe 22 located in the upper part of the separator, the water, being the heaviest phase, being discharged via a pipe 24 located at the base of the separator $S_2$ and the separated liquid hydrocarbon fraction being discharged via a pipe 23 located above pipe 24.

In this case, the injection pressure $p_{ih}$ of the liquid hydrocarbon phase follows a course essentially identical to that of the curve (E) illustrated in FIG. 4 and it can be of advantage to raise it to a level slightly higher than the pressure value $p_e$ of the gas at the pipe inlet.

The aqueous phase behaves slightly differently.

The injection pressure of the liquid hydrocarbon phase is stabilised at the pressure level $p_e$ by increasing the flow rate $qi_w$, of the aqueous phase and an injection pressure value $p_e$ is maintained for an injection rate $q_{w,s}$. However, the injection pressure does not stabilise at the value $p_e$ but increases to a value $p'_e$ for an injection rate of $q'_{w,s}$.

The difference between the pressures $p'_e$ and $p_e$ corresponds in this case to the effect of capillary pressure, which increases the greater the interfacial tension between the two liquid cases, in this case water and the liquid hydrocarbon fraction, and the smaller the diameter of the pores in the porous lining or porous structure.

The flow rate $q_{iw}$, in this case is preferably less than $q'_{w,s}$ so as to prevent the porous lining 16 from being invaded by the fluid circulating in the porous lining 15.

The material used for the porous lining or porous structure in the pipe may be of varying characteristics depending on its length and/or thickness.

It is possible to predetermine lining or pipe structures whose pores are of relatively small diameters close to the internal surface of the lining, i.e. the surface which is closest to the fluid circulating in the pipe and, on the other hand, relatively large diameters where the pores are close to the external surface of the lining or pores which are close to the external wall of the pipe.

In particular, such a choice allows a relatively high capillary pressure, which will thus promote the stability of the fluid circulating inside the porous lining whilst facilitating its circulation therein.

FIG. 10 shows another variant in which transport pipe 1 has a porous tube 30 arranged inside it whose external diameter is smaller than the internal diameter of the pipe 1. This type of arrangement creates an annular space 31, for example, between the internal wall of the transport pipe 1 and the external surface of the porous tube, which is used to facilitate circulation of the fluid retained inside the porous tube, for example.

This annular space 31 may also be used to circulate a second fluid, for example an aqueous phase, if a liquid hydrocarbon phase is circulated inside the porous tube.

In accordance with another embodiment, the transport pipe is made from a composite material. It may be a flexible pipe, for example, in which case a porous material is used which is also flexible, such as a polymer.

The method of the invention may also be used in applications for offshore pipelines providing a link between the seabed and the surface.

Figure 11:
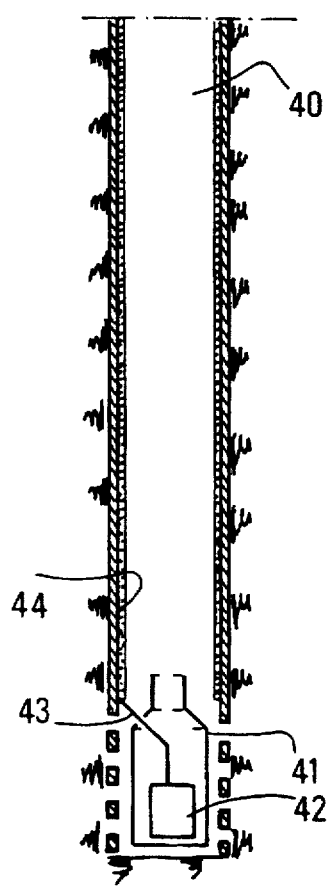

By dint of another embodiment of the invention illustrated in FIG. 11, the method is applied to the transportation of fluids inside a production well 40.

In the case of a well producing gas with a condensate fraction, the two phases are separated by means of a down-hole separator 41, for example. The gas is brought directly up through the well and the liquid hydrocarbon fraction fed by means of the down-hole pump 42 through the pipe 43 shown by dotted lines towards the porous lining 44 inserted inside the well.

The method can be applied to all wells, irrespective of type, wells often being of complex designs, for example with sections which are essentially horizontal located between vertical portions.

A similar arrangement can be used to transport a gas containing water. In this case, two different porous linings are used, one being hydrophilic and the other being oleophilic, to circulate the aqueous phase and the liquid hydrocarbon phase respectively through the first and second lining, the two phases being separated beforehand in a down-hole separator.

I claim:

1. A method of transporting a fluid (I) in a pipeline, characterized in that said fluid (I) is injected into a pipe which has over at least a portion of said pipe, a porous structure having pores and being of a certain degree of porosity and a second Fluid (II) is injected into said pores, said second fluid (II) being retained inside said pores and being at least partially immiscible with said fluid (I) being transported, and wherein said porous structure comprising said second fluid (II) reduces friction on said fluid (I) flowing in said pipe.

2. Application of the method as claimed in claim 1, to the transportation of a compressed natural gas and/or a petroleum crude.

3. A method of transporting a fluid (I) in a pipeline, characterized in that said fluid (I) is injected into a pipe which has over at least a portion of said pipe, a porous structure having pores and being of a certain degree of porosity and a second fluid (II) is injected into said pores, said second fluid (II) being retained inside said pores and being at least partially immiscible with said fluid (I) being transported, and wherein the fluid (I) is injected through said pipe, and the porous structure of said pipe comprises at least one porous lining arranged over at least a portion of a length of said pipe.

4. A method as in claim 3, characterized in that at least one heat insulation lining is inserted between the internal wall of the pipe and the porous lining.

5. A method of transporting a fluid (I) in a pipeline, characterized in that said fluid is infected into a pipe which has over at least a portion of a said pipe, a porous structure having pores and being of a certain degree of porosity and a second fluid (II) is injected into said pores, said second fluid (II) being retained inside said pores and being at least partially immiscible with said fluid (I) being transported, and wherein said second fluid (II) is injected into the pores at the pipe inlet at a sufficient rate to ensure that an injection pressure stabilizes at a value essentially close to the fluid (I) pressure at the inlet of the pipe.

6. A method of transporting a fluid (I) in a pipeline, characterized in that said fluid is injected into a pipe which has over at least a portion of said pipe, a porous structure having pores and being of a certain degree of porosity and a second fluid (II) is injected into said pores, said second fluid (II) being retained inside said pores and being at least partially immiscible with said fluid (I) being transported, wherein at least one anti-corrosion additive or anti-hydrate additive is injected with the second fluid (II).

7. A method of transporting a fluid (I) in a pipeline, characterized in that said fluid is infected into a pipe which has over at least a portion of said pipe, a porous structure having pores and being of a certain degree of porosity and a second fluid (II) is injected into said pores, said second fluid (II) being retained inside said pores and being at least partially immiscible with said fluid (I) being transported, wherein said second fluid (II) is heated before it is injected into the porous structure.

8. A method of transporting a fluid (I) in a pipeline, characterized in that said fluid (I) is injected into a pipe which has over at least a portion of said pipe, a porous structure having pores and being of a certain degree of porosity and a second fluid (II) is injected into said pores, said second fluid (II) being retained inside said pores and being at least partially immiscible with said fluid (I) being transported, wherein at least two porous structures of differing porosity values are used and two fluids of differing natures are circulated through said at least two porous structures, said two fluids of differing natures being at least partially immiscible.

9. A transport pipe for conveying at least one fluid (I) characterized in that said transport pipe has a porous structure over at least a portion of said transport pipe, said porous structure having a certain degree of porosity enabling at least a second fluid (II) which is at least partially immiscible with said fluid (I) being transported to be retained in said pores, wherein said porous structure comprising said fluid (II) reduces friction on said fluid (I) flowing in said pipe.

10. A transport pipe as claimed in claim 9, characterized in that the pores located close to the internal surface of the porous structure of the pipe or the internal surface (S) of the porous lining are of a diameter of less than 10 microns.

11. A transport pipe as claimed in claim 9, characterized in that the porous structure is wettable by the fluid (II).

12. A transport pipe as in claim 9, characterized in that said transport pipe has at least one porous tube inserted inside said transport pipe so as to form an annular space delineated by an internal surface of said transport pipe wall and an external surface of said at least one porous tube.

13. A transport pipe for conveying at least one fluid (I) characterized in that said transport pipe has a porous structure over at least a portion of said transport pipe, said porous structure having a certain degree of porosity enabling at least a second fluid (II) which is at least partially immiscible with said fluid (I) being transported to be retained in said pores, wherein said porous structure has one or more porous linings arranged on an internal wall of the pipe and inside which fluids of differing natures are circulated, said fluids being at least partially immiscible.

14. A transport pipe as in claim 13 characterized in that said transport pipe has at least one internal heat insulation lining.

15. A transport pipe as claimed in claims 13, characterized in that the pores located close to the internal surface of the porous lining are of a diameter of less than 10 microns.

16. A method for reducing the friction which occurs between a fluid flowing in a pipe and a wall of the pipe, comprising injecting said fluid into a pipe, which has over at least a portion said transport pipe, a porous structure having pores and a certain degree of porosity, wherein said pores are in communication with one another, and a second fluid is injected into said pores and circulates into said pores so as to form a thin film on an internal surface of the pipe thereby reducing friction which occurs between a fluid flowing in a pipe and the wall of the pipe.

17. A reduced-friction pipe for conveying at least one fluid (I), said pipe having a porous structure over at least a portion of said pipe, said porous structure having a degree of porosity, wherein pores of said porous structure are in communication with one another on at least a part of said pipe, thereby enabling at least a second fluid (II) which is at least immiscible with said fluid (I), to circulate into said pores and to form a thin film on an internal surface of said pipe.

* * * * *